(12) United States Patent
Berlanger et al.

(10) Patent No.: US 8,464,425 B2
(45) Date of Patent: *Jun. 18, 2013

(54) PROCESS FOR MANUFACTURING A SINGLE-PIECE BLISK WITH A TEMPORARY BLADE SUPPORT RING REMOVED BEFORE A MILLING STEP

(75) Inventors: Serge Berlanger, Leuville sur Orge (FR); Sebastien Bordu, Brie Comte Robert (FR); Thierry Jean Maleville, Milly la Foret (FR); Christophe Charles Maurice Roca, Soisy sur Seine (FR)

(73) Assignee: SNECMA, Paris (FR)

( * ) Notice: Subject to any disclaimer, the term of this patent is extended or adjusted under 35 U.S.C. 154(b) by 379 days.

This patent is subject to a terminal disclaimer.

(21) Appl. No.: 12/933,978

(22) PCT Filed: Mar. 25, 2009

(86) PCT No.: PCT/EP2009/053477
§ 371 (c)(1),
(2), (4) Date: Sep. 22, 2010

(87) PCT Pub. No.: WO2009/121762
PCT Pub. Date: Oct. 8, 2009

(65) Prior Publication Data
US 2011/0023300 A1 Feb. 3, 2011

(30) Foreign Application Priority Data
Mar. 31, 2008 (FR) ...................................... 08 52074

(51) Int. Cl.
*B23P 15/04* (2006.01)
*B24C 1/00* (2006.01)

(52) U.S. Cl.
USPC ........ 29/889.23; 29/418; 29/889.2; 29/889.7; 418/38; 418/40

(58) Field of Classification Search
USPC ........ 29/889, 889.2, 889.7, 557, 558; 451/38, 451/40, 99
See application file for complete search history.

(56) References Cited

U.S. PATENT DOCUMENTS
2,480,807 A * 8/1949 De Vlieg .......................... 409/84
2,633,776 A * 4/1953 Schenk .......................... 409/132
(Continued)

FOREIGN PATENT DOCUMENTS
EP 1 285 714 2/2003
EP 1 433 557 6/2004
(Continued)

OTHER PUBLICATIONS
U.S. Appl. No. 12/921,493, filed Sep. 8, 2010, Berlanger, et al.
(Continued)

*Primary Examiner* — Alexander P Taousakis
(74) *Attorney, Agent, or Firm* — Oblon, Spivak, McClelland, Maier & Neustadt, L.L.P.

(57) ABSTRACT

A process for manufacturing a single-piece bladed disk, including: using an abrasive water jet to cut a block of material, so as to create blade preforms extending radially outwards from a disk, while keeping material forming a connecting mechanism between at least two directly consecutive blade preforms, the connecting mechanism being at a radial spacing from the disk; then removing the connecting mechanism; then milling the blade preforms.

12 Claims, 4 Drawing Sheets

U.S. PATENT DOCUMENTS

| | | | |
|---|---|---|---|
| 2,962,941 A * | 12/1960 | Stein et al. | 409/122 |
| 5,822,841 A | 10/1998 | Bales et al. | |
| 5,867,885 A | 2/1999 | Bales et al. | |
| 6,077,002 A * | 6/2000 | Lowe | 409/132 |
| 6,276,899 B1 | 8/2001 | Lambert et al. | |
| 7,831,332 B2 * | 11/2010 | Diehl | 700/190 |
| 7,967,659 B2 * | 6/2011 | Erickson et al. | 451/5 |
| 2003/0039547 A1 | 2/2003 | Bourgy et al. | |
| 2004/0124181 A1 | 7/2004 | Wei et al. | |
| 2005/0025598 A1 | 2/2005 | Nowak et al. | |

FOREIGN PATENT DOCUMENTS

| | | |
|---|---|---|
| EP | 1 502 682 | 2/2005 |
| FR | 2 699 850 | 7/1994 |
| WO | 2007 082504 | 7/2007 |

OTHER PUBLICATIONS

U.S. Appl. No. 12/933,955, filed Sep. 22, 2010, Berlanger, et al.
U.S. Appl. No. 12/933,951, filed Sep. 22, 2010, Berlanger, et al.
U.S. Appl. No. 12/933,953, filed Sep. 22, 2010, Berlanger, et al.
U.S. Appl. No. 12/933,884, filed Sep. 22, 2010, Berlanger, et al.
Zhao Wan-sheng, et al., "Machining Technology Used in Turbine Blisk", Aviation Precision Manufacturing Technology, vol. 36, No. 5, Oct. 2000, pp. 1-5 (with English Abstract).

* cited by examiner

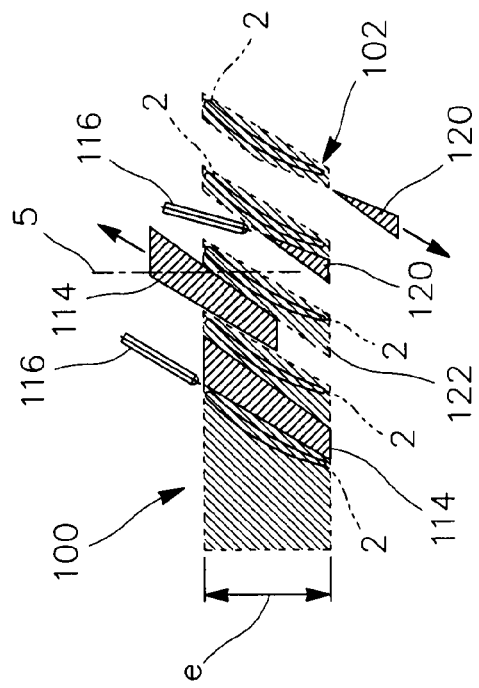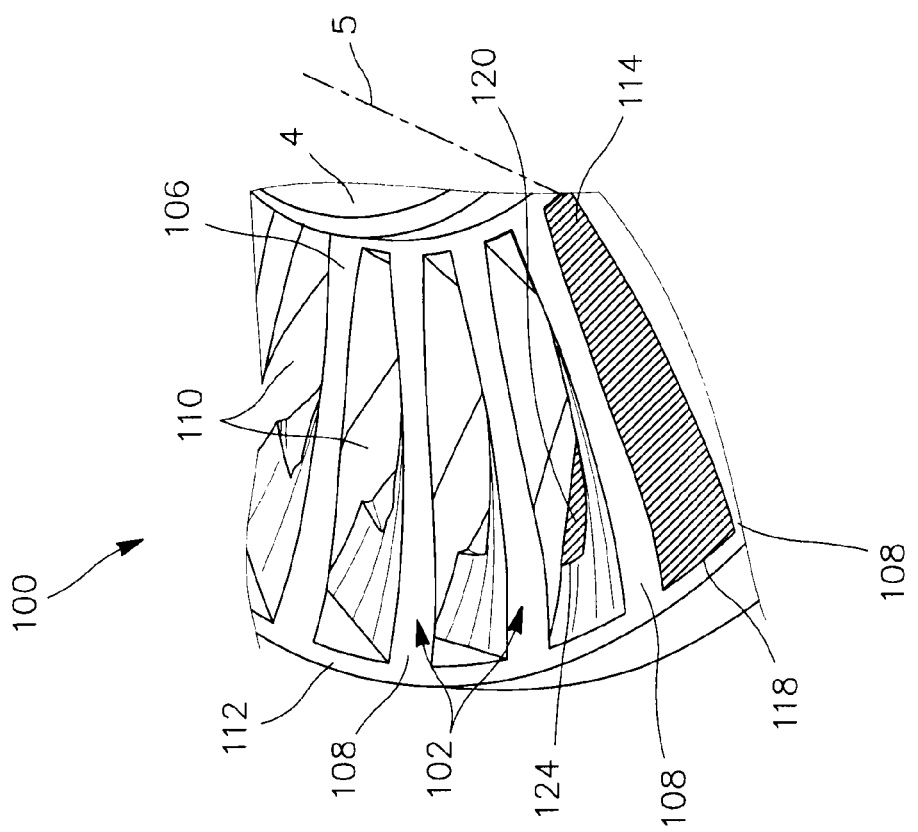
FIG. 2b
FIG. 2a

PROCESS FOR MANUFACTURING A SINGLE-PIECE BLISK WITH A TEMPORARY BLADE SUPPORT RING REMOVED BEFORE A MILLING STEP

TECHNICAL DOMAIN

This invention relates in general to the manufacturing of single-piece blisks, preferably for an aircraft turbine engine.

STATE OF PRIOR ART

A single-piece bladed disk, also called a blisk, can be made using an abrasive water jet to cut a material block in a first step, followed by one or more milling steps.

The use of a cutting step using an abrasive water jet prior to milling can considerably reduce the manufacturing times and costs in comparison with a process based solely on milling. This is particularly due to the fact that such a manufacturing process requires removal of about 75% of the material in the original block to make the blisk. The removal of a large part of this material by cutting with an abrasive jet can reduce production times and also limits wear of milling machines.

Nevertheless, this process cannot be considered to be fully optimised. The presence of deformations and vibrations of the blades during this process is a disadvantage, that becomes particularly severe for long blades. Low advance rates are necessary to limit the consequences of these deformations and vibrations on the quality of the blisk produced, thus slowing production. Vibrations and longer manufacturing times also increase tool wear that has a negative impact on production costs.

SUMMARY OF THE INVENTION

Therefore, the purpose of the invention is to at least partly remedy the above-mentioned disadvantages of embodiments according to prior art.

To achieve this, the object of the invention is a process for manufacturing a single-piece blisk, comprising:
- a step in which an abrasive water jet is used to cut a block of material so as to create blade preforms extending radially outwards from a disk while keeping material to form the connecting means between at least two directly consecutive blade preforms, said connecting means being at a radial spacing from said disk; then
- a step to remove said connecting means; then
- a step to mill blade preforms.

The invention is thus remarkable in that during the cutting step using an abrasive water jet, it creates connecting means between at least two blade preforms, and preferably between all these blade preforms. This can strongly limit or even eradicate deformations and vibrations of blades while they are being manufactured, since they remain fixed to each other mechanically by material in the initial block.

This specific feature means that the different tools can be used at high advance rates thus reducing production times, without jeopardising the quality of the finished blisk. Furthermore, the reduction of production times and the reduction of blade vibrations during manufacturing slow tool wear, which advantageously limits production costs.

Preferably, the cutting step using an abrasive water jet is done such that said connecting means join more than three blade preforms to each other, preferably directly consecutive to each other. However, it would be possible to envisage several sets of directly consecutive preforms connected to each other, but with the sets not connected to each other. In any case, regardless of the needs encountered, the number of blade preforms fixed to each other by connecting means and the arrangement of these connecting means on the preforms, may be adapted.

According to one preferred embodiment, the cutting step using an abrasive water jet is done such that said connecting means approximately form a ring, preferably centred on the axis of the disk. This ring preferably extends around 360° and is possibly interrupted by the blade preforms that it connects together. However as mentioned above, this ring is not necessarily completely closed, in other words it may not connect all directly consecutive preforms.

However, the cutting step using an abrasive water jet is preferably made such that said ring connects all blade preforms to each other, and each preform will subsequently form one blade of the blisk. In this case, it will preferably be arranged such that the cutting step using an abrasive water jet is done with said ring connecting the tips of the blade preforms to each other. The ring then forms a peripheral annular portion of the cutout block with the preforms of the blades extending radially inwards from this ring, towards the disk.

Nevertheless, one alternative solution could be to carry out the cutting step using an abrasive water jet such that said ring connects said blade preforms together at a radially inwards distance from their tips. For example in this case, it would be possible for the ring to connect the preforms to each other at approximately mid-length.

Note that the two solutions proposed above can be combined, namely a peripheral support ring and an inner support ring radially inwards from the peripheral ring can both be provided. More generally, when a peripheral support ring is provided, additional connecting means between blade preforms can be provided, not necessarily in ring form, without going outside the scope of the invention.

The material forming the connecting means is preferably kept until the end of the abrasive water jet cutting step. It is then removed only during a later step in the blisk manufacturing process.

Note in this respect that the step to mill blade preforms is done so as to obtain profiled blade blanks, this step preferably being followed by a milling step to finish blade blanks so as to obtain blades to the final profile.

Obviously, other conventional steps can be used in the process according to the invention, such as:
- turning of the material block before the cutting step using an abrasive water jet;
- polishing and/or shot blasting of the blades after the finishing step;
- cutting blades to length;
- and balancing of the blisk.

Preferably, the diameter of said single-piece blisk is greater than or equal to 800 mm. In this respect, note that the presence of connecting means holding the blades together during manufacturing makes it possible to manufacture large diameter blisks with long blades since the blade deformations and vibrations are reduced or even eliminated. Preferably, the minimum length of the blades is 150 mm.

Preferably, the thickness of said single-piece blisk is greater than or equal to 100 mm. Nevertheless, it may be of the order of 160 mm or even more due to the potentially high performances that can be achieved by the abrasive water jet cutting technique. This thickness is approximately equal to the distance along the blisk axis covered by each blade, between the leading edge and the trailing edge.

Preferably, the blades of the single-piece blisk are twisted, the angle of twist varying up to 45° or even more.

Preferably, said material block used is made of titanium or a titanium alloy.

Preferably, said single-piece blisk is a single-piece blisk for an aircraft turbine engine.

Even more preferably, said single-piece blisk is a single-piece blisk for a turbine or compressor rotor in an aircraft turbine engine.

Other advantages and characteristics of the invention will become clear after reading the following detailed and non-limitative description.

BRIEF DESCRIPTION OF THE DRAWINGS

This description will be made with reference to the appended drawings among which;

FIGS. 2a to 2e represent views diagrammatically showing the single-piece blisk at different steps in its manufacturing process, when the blisk is made according to one of the preferred embodiments.

DETAILED DESCRIPTION OF PREFERRED EMBODIMENTS

Figure 1:
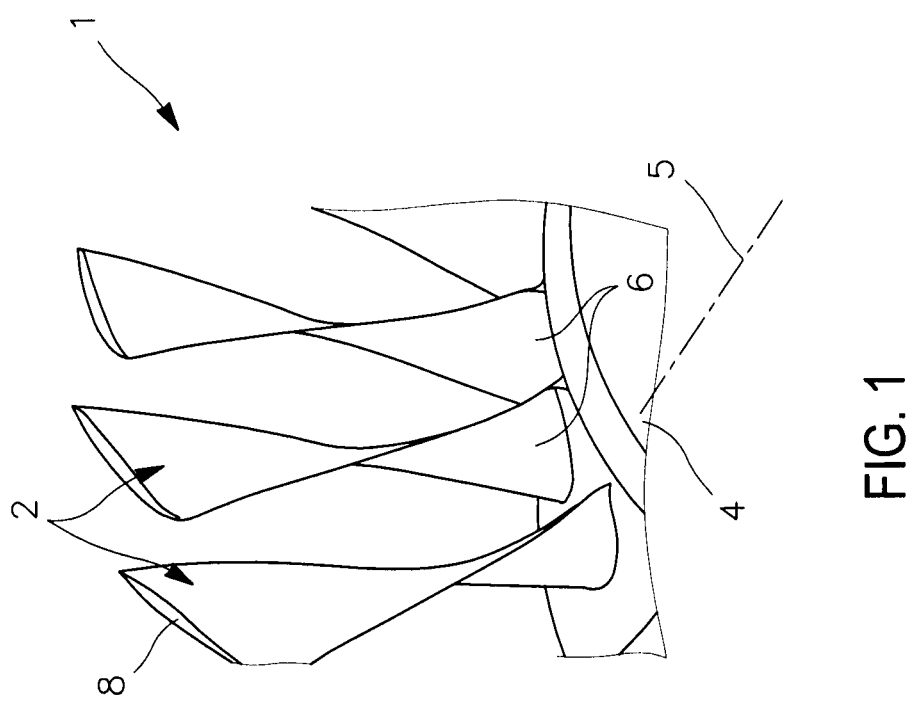
FIG. 1 shows a perspective partial view of a single-piece blisk for a turbine engine that can be obtained by implementing the manufacturing process according to this invention.

Firstly with reference to FIG. 1, the figure shows a single-piece blisk 1 to be obtained by the use of a manufacturing process according to this invention. It is preferably intended to form part of a compressor or turbine rotor for an aircraft turbine engine.

The single-piece blisk, hereinafter referred to as a blisk that is to be obtained using the process according to this invention is large, in other words its diameter is greater than or equal to 800 mm, the length of its blades 2 is not less than 150 mm and the thickness <<e>> of its disk 4 is greater than or equal to 130 mm. Furthermore, the blades supported by the disk 4 with its central axis 5 are strongly twisted with an angle of twist up to or even more than 45°. For information, this angle is equal to the fictitious angle between the root 6 and the tip 8 of a specific blade 2, according to conventional practice.

A preferred embodiment of the process for manufacturing the blisk 1 will now be described with reference to FIGS. 2a to 2e.

Firstly, a first turning step is performed on a block of material made of titanium alloy, also called a <<single-piece blank>> and preferably pre-machined, to machine this block for example to within 1 mm of its final dimensions.

The next step consists of cutting the solid block using an abrasive water jet so as to form the blade preforms.

This is done using a very high pressure (for example 3000 bars) and very high precision water jet cutting machine (for example a 6-axis machine). The very high water pressure transports the abrasive optimising its cutting effect on the material. The water jet is created in a known manner using a diamond or sapphire nozzle. There is also a mixing chamber used to add abrasive such as sand. A focussing gun homogenises the water and sand, focussing sand on the zone to be cut.

This abrasive jet cutting technique enables a large material removal rate and good repeatability. It is thus perfectly suitable for removing material so as to create inter-blade spaces through the entire thickness <<e>> of the material block along its axis 5.

This is illustrated in FIG. 2a that shows the top part of the material block 100 after the abrasive water jet cutting step is complete. Therefore this block comprises blade preforms 102 extending radially from disk 4, in other words orthogonal to the central axis 5. In general, the cutout is made within the thickness of the block 100 so as to form inter-blade spaces 110 between directly consecutive blade preforms 102 in the circumferential direction.

It is also done so as to form the connection means between the preforms 102, in this case taking the form of a ring 112 centred on the axis 5 and preferably connecting all tips 108 of the blade preforms 102. Thus, the ring 112 forms a peripheral annular portion of the cutout block 100, and consequently creates an external radial delimitation of the inter-blade spaces 110 that is kept until the cutting step is complete.

This abrasive water jet cutting step can be implemented by making a first cutting operation to remove a first piece of material that twists or has a spiral shape along the radial direction from the disk, followed by a second cutting operation to remove a second smaller volume of material, that also twists or has a spiral shape along the radial direction.

More precisely, the left part of the diagrammatic view contained in FIG. 2b shows that the first cutting operation will cut out a first piece of material 114 extending through the entire thickness of the block 100 along its axis 5. This is done by moving the axis of the focussing gun 116 along a closed line 118 shown in the lower part of FIG. 2a, initiated from the root 4 and extending along the radial direction to near the outer radial end of the block but without reaching it so as to form the ring, the line 118 then following this ring in the circumferential direction before changing to the radially inwards direction again to reach the root 4, and then following this root back to its initial point.

During its path along the above-mentioned line 118, the axis of the gun 116 moves by an appropriate additional movement relative to the axis 5 that preferably remains fixed, this additional movement essentially consisting of the axis of the gun pivoting about the radial direction and forming a first piece 114 with a generally twisted shape along the radial direction. More generally, note that the path followed by the gun 116 relative to the axis 5 is a so-called 5-axis path obtained by two simultaneous rotations. The first piece 114 is preferably removed manually by the operator as shown diagrammatically in the central part of FIG. 2b. As can be seen on this figure that shows a typical section perpendicular to the radial direction, the piece 114 is in the form of a quadrilateral for which the two opposite sides along the thickness of the block pass very close to the two directly consecutive blades 2 that will be obtained once the process is complete.

Following on from the above, each removal of a first piece 114 forms the surface of two directly consecutive blade preforms 102. Preferably, the first step is to cut out all the first pieces 114, the number of which depends on the number of blades to be provided in the blisk, and these pieces 114 are then removed manually before starting the second cutting operation.

This second operation is done such that the shape of the resulting blade preforms is as close as possible to the twisted shape with inverted curvature of the final blades which is difficult to approach with a single cut since the abrasive water jet passes through the block in an approximately straight line, although the blade sections are curved.

The right part of the diagrammatic view contained in FIG. 2b shows that the second cutting operation will cut out a second piece of material 120 that extends over only part of the thickness of the block 100, in other words over only part of the thickness of the radial elements 122 formed by removal of the first pieces 114. The piece 120 also extends only along a radial portion of its associated element 122, namely it extends starting from the root without reaching the ring, as can be seen in FIG. 2a.

This is done by moving the focussing gun 116 along a radial line 124, a portion of which is shown in FIG. 2a. This line is initiated from the root 4 and therefore extends approximately radially without reaching the ring 112 that appeared during removal of the first pieces 114. For example, line 124 through which the abrasive water jet passes is at approximately mid-thickness of the radial elements 122 and it stops beyond the radial mid-height of these elements.

During its path along the above-mentioned line 124, the axis of the gun 116 is driven by an appropriate additional movement relative to the axis 5 that preferably remains fixed, this additional movement essentially involving pivoting of the axis of the gun about the radial direction, and forming a second piece 120 with a twisted shape along the radial direction. More generally, note that the path followed by the gun 116 relative to the axis 5 is a so-called 5-axis path obtained by two simultaneous rotations. This second piece 120, once completely separated from the root 5 by the abrasive water jet, preferably separates by itself without assistance by the operator, as shown diagrammatically in the right part of FIG. 2b.

In this respect, note that the gun 116 moves not only along the approximately radial line 124, but also along a circular portion (not shown) of a line extending from the inner radial end of the line 124 along the root 4 to completely separate the piece 120 from the root.

As can be seen in FIG. 2b that shows an arbitrary section perpendicular to the radial direction, the piece 120 is in the form of a triangle of which one of the sides passes as close as possible to the blade 2 that will be obtained from the radial element 122 concerned once the process is complete.

Once all the second pieces 120 have been removed, all that remains of the block are the blade preforms 102 attached to each other at their tips 108 by the ring 112. The abrasive water jet cutting step is then complete.

In this preferred embodiment, the process continues with a step in which the ring 112 connecting the blade preforms 112 is removed. This step is done in any manner that an expert in the subject considers appropriate, such as wire cutting or milling. In this respect, FIG. 2c schematically shows separation of the ring 112 from the rest of the block 100, by breakage of the link between this ring 112 and the preform tips 108. Once all these approximately circumferential breaks 128 have been obtained, the ring may be effectively extracted from the block by relative displacement along axis 5 of the block. The ring 112 is then considered to be eliminated. Alternately, the ring 112 could be removed simply by eliminating portions of this ring located between the preforms 102, the other portions located at the radial end of these preforms then being kept, for example so as to form part of the tips of the blades at a later stage. The required breaks are then no longer approximately circumferential like the breaks 128 in FIG. 2c, but are approximately radial and still within the thickness of the block.

The next step is to mill the blade preforms 102 so as to obtain profiled blade blanks 202. In other words, the purpose of this step, for example done using a 5-axis milling machine, is to remove the material remaining on the blade preforms 102 to approach the final dimensions, for example within 0.6 mm.

Figure 2D:
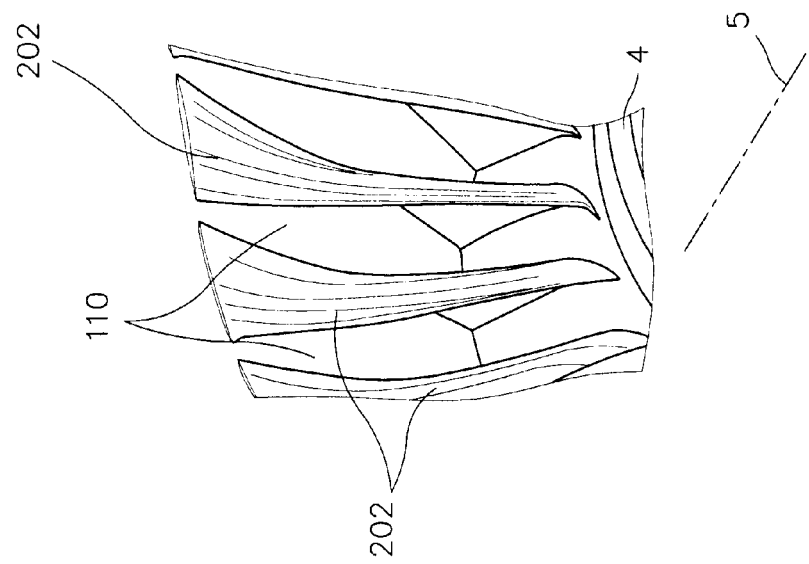
Figure 2C:
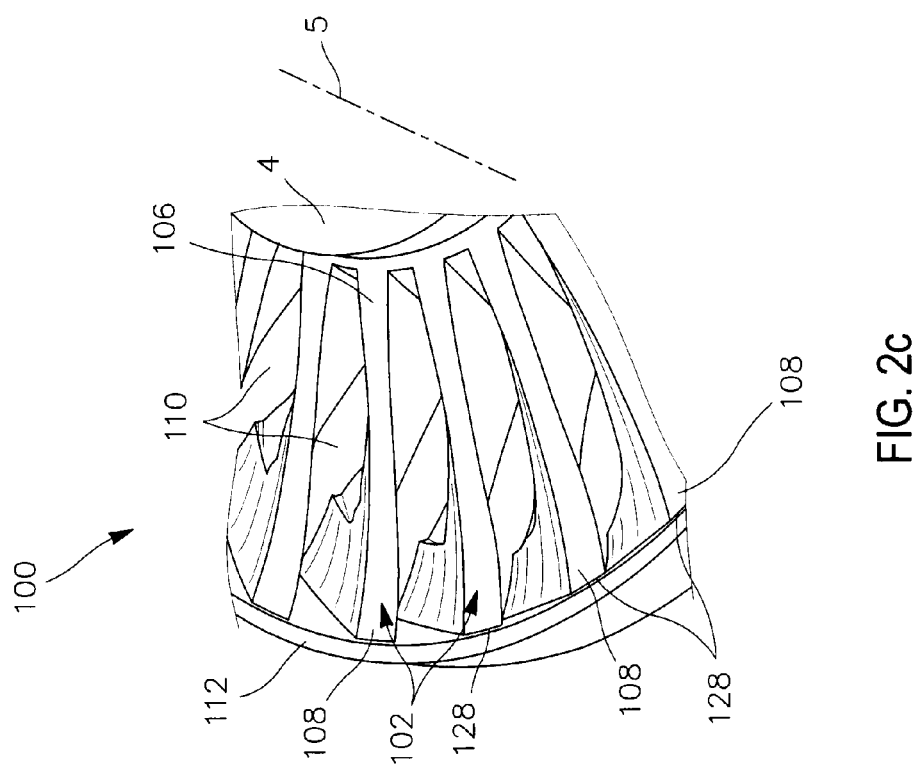
Figure 2E:
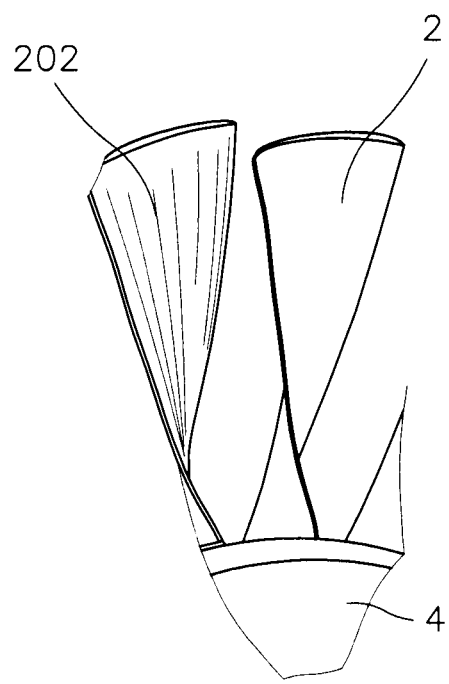

In this case, the preforms 102 are preferably machined one by one and each forms a profiled blade blank 202, as shown in FIG. 2d.

Another milling step is then done and is called the finishing step to mill the blades 2 to achieve their final profile from the blanks 202. The tooling used enables more precise machining to obtain the final dimensions, therefore obtaining blades 2 as shown in the right part of FIG. 2e.

At this stage of the process, the remaining volume of material is less than 25% of the volume of this block just before initiation of the abrasive water jet cutting step, namely just after the above-mentioned turning step.

The process may also be continued by one or several conventional steps including a polishing step for example by manual fitting or tribofinishing, a shot blasting step, a blade cutting to length step and/or a blisk balancing step.

Although the embodiment mentioned above was described with a support ring 112 formed at the blade tips, it could equally well be formed at a more central part of these blades, radially inwards from the tips.

Obviously, an expert in the subject could make various modifications to the invention as described above, solely as non-limitative examples.

The invention claimed is:

1. A process for manufacturing a single-piece bladed blisk, comprising:
   using an abrasive water jet to cut a block of material, so as to create blade preforms extending radially outwards from a disk, while keeping material to form a connecting mechanism between at least two directly consecutive blade preforms, the connecting mechanism being at a radial spacing from the disk;
   removing the connecting mechanism; and
   milling the blade preforms.

2. The process according to claim 1, wherein the cutting using an abrasive water jet is done such that the connecting mechanism joins more than three blade preforms to each other, or directly consecutive to each other.

3. The process according to claim 2, wherein the cutting using an abrasive water jet is done such that the connecting mechanism approximately forms a ring.

4. The process according to claim 3, wherein the cutting using an abrasive water jet is made such that the ring connects all blade preforms to each other.

5. The process according to claim 3, wherein the cutting using an abrasive water jet is done so that the ring connects tips of the blade preforms to each other.

6. The process according to claim 1, wherein the milling the blade preforms is done so as to obtain profiled blade blanks, followed by a milling to finish blade blanks, so as to obtain blades to a final profile.

7. The process according to claim 1, wherein the diameter of the single-piece blisk is greater than or equal to 800 mm.

8. The process according to claim 1, wherein the thickness of the single-piece blisk is greater than or equal to 100 mm.

9. The process according to claim 1, wherein the blades of the single-piece blisk are twisted.

10. The process according to claim 1, wherein the material block used is made of titanium or a titanium alloy.

11. The process according to claim 1, wherein the single-piece blisk is a single-piece blisk for an aircraft turbine engine.

12. The process according to claim 1, wherein the single-piece blisk is a single-piece blisk for a turbine or compressor rotor in an aircraft turbine engine.

* * * * *